US010754332B2

(12) United States Patent
Tani et al.

(10) Patent No.: US 10,754,332 B2
(45) Date of Patent: Aug. 25, 2020

(54) MONITORING DEVICE THAT PERFORMS MONITORING ON OPERATIONS OF AN ACTUAL MACHINE

(71) Applicant: OMRON Corporation, Kyoto (JP)

(72) Inventors: Satoshi Tani, Osaka (JP); Takaaki Yoshii, Nagoya (JP); Satoshi Oyama, Yasu (JP); Katsuhisa Furuta, Suita (JP)

(73) Assignee: OMRON Corporation, Kyoto (JP)

(*) Notice: Subject to any disclaimer, the term of this patent is extended or adjusted under 35 U.S.C. 154(b) by 452 days.

(21) Appl. No.: 15/750,203

(22) PCT Filed: Oct. 31, 2016

(86) PCT No.: PCT/JP2016/082292
§ 371 (c)(1),
(2) Date: Feb. 5, 2018

(87) PCT Pub. No.: WO2017/094422
PCT Pub. Date: Jun. 8, 2017

(65) Prior Publication Data
US 2018/0224841 A1   Aug. 9, 2018

(30) Foreign Application Priority Data
Nov. 30, 2015   (JP) .................................. 2015-234201

(51) Int. Cl.
*G05B 19/18* (2006.01)
*G05B 19/05* (2006.01)
(Continued)

(52) U.S. Cl.
CPC ..... *G05B 23/0259* (2013.01); *G05B 19/0423* (2013.01); *G05B 19/18* (2013.01);
(Continued)

(58) Field of Classification Search
None
See application file for complete search history.

(56) References Cited

U.S. PATENT DOCUMENTS 9,740,185 B2 * 8/2017 Nakagawa ........... G05B 19/056
10,190,873 B1 * 1/2019 Yamagami ............. G01B 11/02
(Continued)

FOREIGN PATENT DOCUMENTS

CN   101900777   12/2010
CN   101932982   12/2010
(Continued)

OTHER PUBLICATIONS

"International Search Report (Form PCT/ISA/210) of PCT/JP2016/082292", dated Jan. 24, 2017, with English translation thereof, pp. 1-4.
(Continued)

*Primary Examiner* — Kibrom K Gebresilassie
(74) *Attorney, Agent, or Firm* — JCIPRNET (57) ABSTRACT

Provided is a monitoring device capable of easily ascertaining an abnormality. A monitoring device comprises: an acquisition unit which acquires actual operation data (53a) from a control device which controls an actual machine; a storage unit which stores reference operation data indicating reference operation of the actual machine, first related information and second related information; a timing chart generation unit which generates an actual operation timing chart and a reference operation timing chart, and displays the timing charts on a display device; and a simulation data generation unit which generates simulation data of a reference image and a real image.

19 Claims, 8 Drawing Sheets

(51) Int. Cl.
  G05B 23/02 (2006.01)
  G05B 19/042 (2006.01)
  G05B 19/4069 (2006.01)
  B25J 9/16 (2006.01)
(52) U.S. Cl.
  CPC ............ *G05B 23/02* (2013.01); *B25J 9/1671* (2013.01); *G05B 19/0426* (2013.01); *G05B 19/05* (2013.01); *G05B 19/4069* (2013.01); *G05B 2219/13174* (2013.01); *G05B 2219/23445* (2013.01); *G05B 2219/33301* (2013.01); *G05B 2219/34475* (2013.01)

(56) References Cited

U.S. PATENT DOCUMENTS

| | | | | |
|---|---|---|---|---|
| 2003/0028266 | A1* | 2/2003 | Jacques | G05B 5/01 700/32 |
| 2003/0090489 | A1* | 5/2003 | Watanabe | B25J 9/1671 345/473 |
| 2005/0283270 | A1 | 12/2005 | Nakamura | |
| 2009/0011515 | A1* | 1/2009 | Soleta | G01N 31/00 436/104 |
| 2009/0177722 | A1* | 7/2009 | Midorogi | G06F 15/02 708/130 |
| 2013/0124184 | A1* | 5/2013 | Sakaguchi | G06F 30/20 703/22 |
| 2014/0058538 | A1* | 2/2014 | Yaoita | G06F 11/323 700/28 |
| 2014/0236317 | A1* | 8/2014 | Nagata | G05B 19/416 700/63 |
| 2015/0084572 | A1* | 3/2015 | Tanaka | G05B 11/36 318/568.1 |
| 2015/0346710 | A1* | 12/2015 | Hirose | G05B 19/401 700/28 |
| 2016/0033953 | A1* | 2/2016 | Nakagawa | G05B 19/0426 700/29 |
| 2016/0065316 | A1* | 3/2016 | Tsunoda | H04L 7/0337 398/155 |
| 2016/0126838 | A1* | 5/2016 | Cavallini | H02M 3/158 315/185 R |
| 2016/0283352 | A1* | 9/2016 | Kraus | H04L 41/00 |
| 2017/0153611 | A1* | 6/2017 | Fujii | G05B 13/042 |
| 2018/0283278 | A1* | 10/2018 | Adibhatla | F01D 25/12 |
| 2020/0070282 | A1* | 3/2020 | Takeda | B25J 9/1671 |

FOREIGN PATENT DOCUMENTS

| | | |
|---|---|---|
| CN | 101981522 | 2/2011 |
| CN | 102841580 | 12/2012 |
| CN | 103717995 | 4/2014 |
| CN | 103823396 | 5/2014 |
| CN | 104583887 | 4/2015 |
| CN | 105103064 | 11/2015 |
| EP | 1759817 | 3/2007 |
| JP | 2004038565 | 2/2004 |
| JP | 2006004128 | 1/2006 |
| JP | 2008234131 | 10/2008 |
| JP | 2009251790 | 10/2009 |

OTHER PUBLICATIONS

"Written Opinion of the International Searching Authority of PCT/JP2016/082292" with English translation thereof, dated Jan. 24, 2017, p. 1-p. 6.

"Office Action of China Counterpart Application," with English translation thereof, dated Oct. 8, 2019, p. 1-p. 13.

"Search Report of Europe Counterpart Application", dated Jul. 5, 2019, pp. 1-5.

* cited by examiner

FIG. 1

|  WORK: aaa<br>LOT NUMBER: 001 | | | | | | |
|---|---|---|---|---|---|---|
| Time | AAA | BBB | CCC | ... | NNN | OOO | ... |
| ⋮ | ⋮ | ⋮ | ⋮ | | ⋮ | ⋮ | |
| 2015-10-29-16:51:04.639 | 0 | 0 | 0 | | 0 | 0 | |
| 2015-10-29-16:51:04.643 | 0 | 0 | 0 | | 1 | 0 | |
| 2015-10-29-16:51:04.647 | 0 | 0 | 0 | | 2 | 0 | |
| 2015-10-29-16:51:04.651 | 1 | 0 | 0 | | 3 | 0 | |
| 2015-10-29-16:51:04.655 | 1 | 0 | 0 | | 4 | 0 | |
| 2015-10-29-16:51:04.659 | 1 | 0 | 0 | | 5 | 0 | |
| 2015-10-29-16:51:04.663 | 0 | 0 | 0 | | 6 | 0 | |
| 2015-10-29-16:51:04.667 | 0 | 0 | 0 | | 7 | 0 | |
| 2015-10-29-16:51:04.671 | 0 | 1 | 0 | | 8 | 0 | |
| 2015-10-29-16:51:04.675 | 0 | 1 | 0 | | 9 | 0 | |
| 2015-10-29-16:51:04.679 | 0 | 1 | 0 | | 10 | 0 | |
| 2015-10-29-16:51:04.683 | 0 | 1 | 0 | | 11 | 0 | |
| 2015-10-29-16:51:04.687 | 0 | 1 | 0 | | 12 | 0 | |
| 2015-10-29-16:51:04.691 | 0 | 0 | 1 | | 13 | 0 | |
| ⋮ | ⋮ | ⋮ | ⋮ | | ⋮ | ⋮ | |

TIMING a → row at 2015-10-29-16:51:04.651

TIMING b → row at 2015-10-29-16:51:04.671

FIG. 2

|  | 52a | 52a-1 | | | | |
|---|---|---|---|---|---|---|
| WORK: aaa | | | | | | |
| Time | AAA | BBB | CCC | ... | NNN | OOO | ... |
| : | : | : | : | | : | : | |
| 2015-10-01-13:15:00.125 | 0 | 0 | 0 | | 0 | 0 | |
| 2015-10-01-13:15:00.129 | 1 | 0 | 0 | | 1 | 0 | |
| 2015-10-01-13:15:00.133 | 1 | 0 | 0 | | 2 | 0 | |
| 2015-10-01-13:15:00.137 | 1 | 0 | 0 | | 3 | 0 | |
| 2015-10-01-13:15:00.141 | 0 | 0 | 0 | | 4 | 0 | |
| 2015-10-01-13:15:00.145 | 0 | 1 | 0 | | 5 | 0 | |
| 2015-10-01-13:15:00.149 | 0 | 1 | 0 | | 6 | 0 | |
| 2015-10-01-13:15:00.153 | 0 | 1 | 0 | | 7 | 0 | |
| 2015-10-01-13:15:00.157 | 0 | 0 | 0 | | 8 | 0 | |
| 2015-10-01-13:15:00.161 | 0 | 0 | 1 | | 9 | 0 | |
| 2015-10-01-13:15:00.165 | 0 | 0 | 0 | | 10 | 0 | |
| 2015-10-01-13:15:00.169 | 0 | 0 | 0 | | 11 | 0 | |
| 2015-10-01-13:15:00.173 | 0 | 0 | 0 | | 12 | 0 | |
| 2015-10-01-13:15:00.177 | 0 | 0 | 0 | | 13 | 0 | |
| : | : | : | : | | : | : | |

TIMING → a (rows 2015-10-01-13:15:00.129 through .137)

TIMING → b (rows 2015-10-01-13:15:00.145 through .153)

FIG. 3

| MAJOR ITEM | MIDDLE ITEM | NAME OF VARIABLE |
|---|---|---|
| ALIGNMENT FH MEASUREMENT | CURRENTLY MEASURED | AAA |
| | NO MEASUREMENT DONE | |
| TRACK FH MEASUREMENT | CURRENTLY MEASURED | HHH |
| | NO MEASUREMENT DONE | |
| TRACK CONTROL | TRACK UNDER CONTROL | III |
| | NO TRACK CONTROL DONE | |
| WORK ADSORPTION | CURRENTLY ADSORBED | BBB |
| | NO ADSORPTION DONE | |
| SEATING | CURRENTLY SEATED | CCC |
| | NO SEATING DONE | |
| MOUNTING CYLINDER | LIFTED | DDD |
| | LOWERED | EEE |
| HORIZONTAL MOVEMENT | MOUNTED POSITION | FFF |
| | STACKER POSITION | GGG |
| TRACK CYLINDER | LIFTED | LLL |
| | LOWERED | MMM |
| WORK TRANSPOR | TRACK SIDE | JJJ |
| | ALIGNMENT SIDE | KKK |
| θ AXIS MOVEMENT | | NNN |

FIG. 4

| CLASSIFICATION | PURPOSE | |
|---|---|---|
| ALIGNMENT (MOUNTING) UNIT | CYLINDER LOWERING COMMAND | OOO |
| | CYLINDER LIFTING COMMAND | PPP |
| | HORIZONTAL AXIS CURRENT VALUE | QQQ |
| TRANSPORT UNIT | TRANSPORT AXIS CURRENT VALUE | RRR |
| TRACK CONTROL UNIT | CYLINDER LOWERING COMMAND | SSS |
| | CYLINDER LIFTING COMMAND | TTT |
| | Y-AXIS CURRENT VALUE | UUU |
| | X-AXIS CURRENT VALUE | VVV |
| ALIGNMENT (UNMOUNTING) | CYLINDER LIFTING COMMAND | WWW |
| | CYLINDER LOWERING COMMAND | XXX |
| | HORIZONTAL AXIS CURRENT VALUE | YYY |

MONITORING DEVICE THAT PERFORMS MONITORING ON OPERATIONS OF AN ACTUAL MACHINE

CROSS-REFERENCE TO RELATED APPLICATION

This application is a 371 application of the international PCT application serial no. PCT/JP2016/082292, filed on Oct. 31, 2016, which claims the priority benefit of Japan application no. 2015-234201, filed on Nov. 30, 2015. The entirety of each of the abovementioned patent applications is hereby incorporated by reference herein and made a part of this specification.

BACKGROUND

Technical Field

The present invention relates to a monitoring device, a monitoring system, a monitoring program, and a recording medium.

Description of Related Art

In the related art, monitoring devices capable of monitoring operations and states of industrial machines such as machine tools in real time are known.

For example, Japanese Unexamined Patent Application Publication No. 2008-234131A (Patent Literature 1) describes a machine tool monitoring system capable of easily finding an abnormal operation by displaying working command information that is information input to a machine tool and processing execution information that is information output from the machine tool on the same display window.

In addition, Japanese Unexamined Patent Application Publication No. 2004-38565A (Patent Literature 2) discloses a working machine monitoring device capable of allowing an operator to ascertain a state of a working machine by causing a virtual model to reproduce an operation of the working machine that is being operated in real time and displaying a portion where an abnormality has occurred on the virtual model.

However, the technique described in Patent Literature 1 described above has a problem that it is not easy to ascertain an abnormality since no reference information is displayed although it is possible to ascertain deviation between the input information and the output information. In addition, the technique described in Patent Literature 2 has a problem that it is not possible to easily ascertain an abnormality since only the actual motion of the working machine is displayed as the virtual model and no reference motion is displayed even of the motion of the working machine can be visually ascertained using the virtual model.

SUMMARY

The present invention was made in view of the problems described above, and an object thereof is to provide a monitoring device capable of easily ascertaining an abnormality.

In order to solve the problems described above, the monitoring device according to the embodiment is a monitoring device that performs monitoring on operations of an actual machine, the device including: an acquisition unit which acquires actual operation data that indicates actual operations of each portion of an actual machine from a control device which controls the actual machine; a display item setting unit that sets display items that are included in a timing chart that is displayed on a display device; and a storage unit, in which the storage unit stores reference operation data indicating a reference operation of each portion of the actual machine, first related information that associates specific actual operation data and reference operation data with the display items, and second related information that associates components that are included in a virtual machine on an image that simulates the actual machine with the specific actual operation data and the reference operation data, in which the device further includes: a timing chart generation unit which generates an actual operation timing chart that indicates a temporal change in an actual operation based on actual operation data corresponding to the display items in the first related information and generates a reference operation timing chart that indicates temporal change in a reference operation on basis of reference operation data corresponding to the display item in the first related information for the display items, and displays the actual operation timing chart and the reference operation timing chart on the display device; and a simulation data generation unit which generates simulation data of a reference image that is an image when the virtual machine performs a reference operation and a real image that is an image when the virtual machine performs an actual operation, on a basis of the reference operation data and the actual operation data that are associated with the components in the second related information.

According to an aspect of the present invention, it is possible to provide a monitoring device capable of easily ascertaining an abnormality.

DESCRIPTION OF THE EMBODIMENTS

An embodiment of the disclosure will be described below in detail with reference to the accompanying drawings. The same or corresponding elements in the drawings will be referenced by the same reference signs and description thereof will not be repeated.

Hereinafter, an embodiment of the present invention will be described in detail.

(Configuration of Monitoring System)

Figure 1:
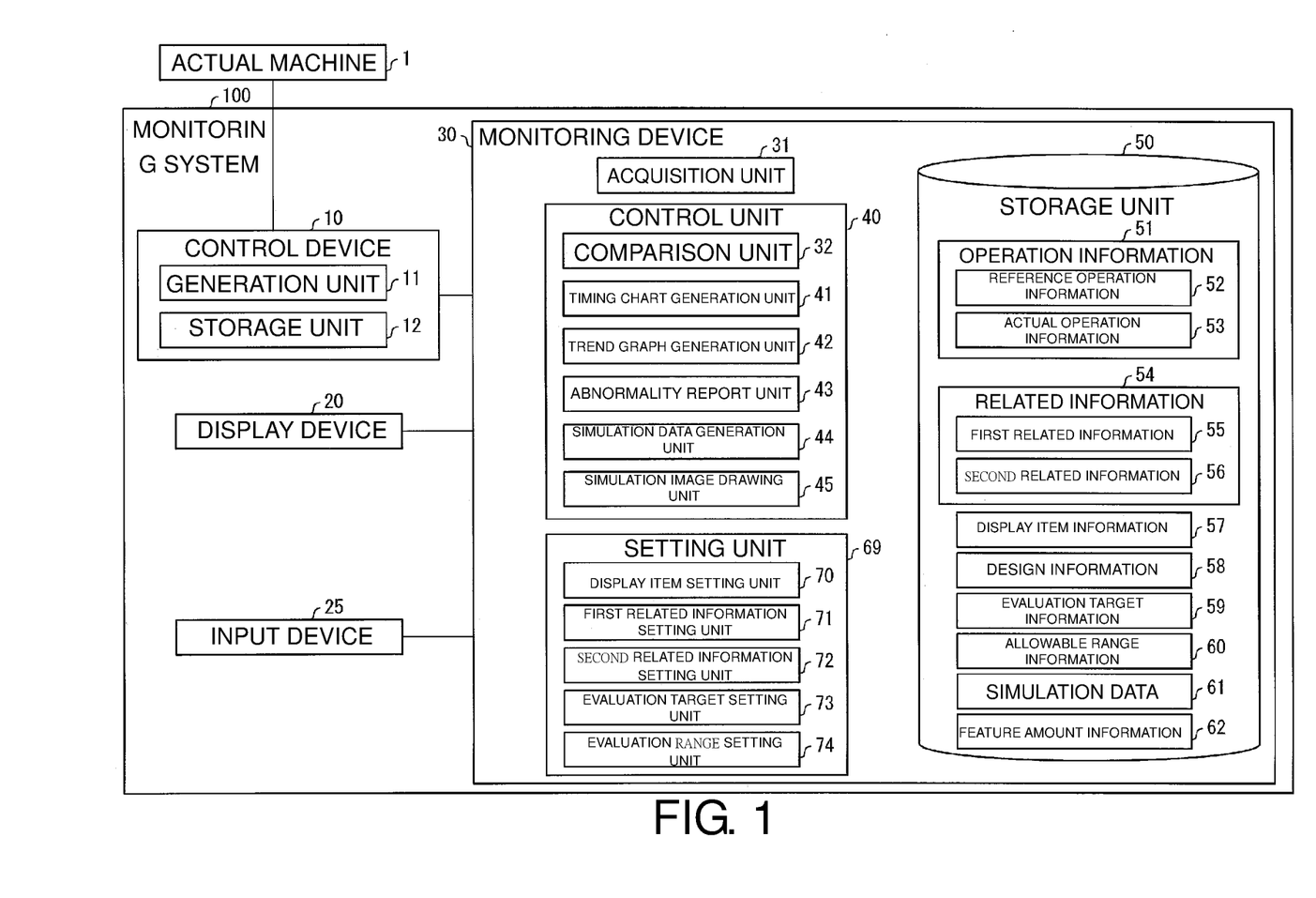
FIG. 1 is a block diagram illustrating a configuration of a monitoring system according to an embodiment.

FIG. 1 is a block diagram illustrating a configuration of a monitoring system 100 according to the embodiment. The monitoring system 100 includes a control device 10 that controls a control target, a display device 20, and a monitoring device 30.

The control device 10 is an industrial control device such as a programmable logic controller (PLC), for example. FIG. 1 illustrates an actual machine 1 that is a manufacturing device as an example of the control target that is controlled by the control device 10. The control device 10 transmits a control signal that has been calculated by control computation programmed in advance to the actual machine 1 that is a control target and controls each portion of the actual machine 1. Note that the control device 10 can execute sequence control of controlling ON/OFF of an actuator of the actual machine and motion control of successively controlling operation displacement, an operation speed, and the like of the actuator in accordance with output signals from various sensors that are disposed in the actual machine 1. Further, the control device 10 according to the embodiment executes the sequence control and the motion control at the same cycle.

In addition, the control device 10 receives operation signals from a limit switch, sensors, and the like that are disposed in the actual machine 1. Although timings at which the control device 10 receives the operation signals are not particularly limited, it is preferable that the control device 10 acquire the operation signals at predetermined intervals, such as every 2 msec or every 4 msec, for example.

Figure 2:
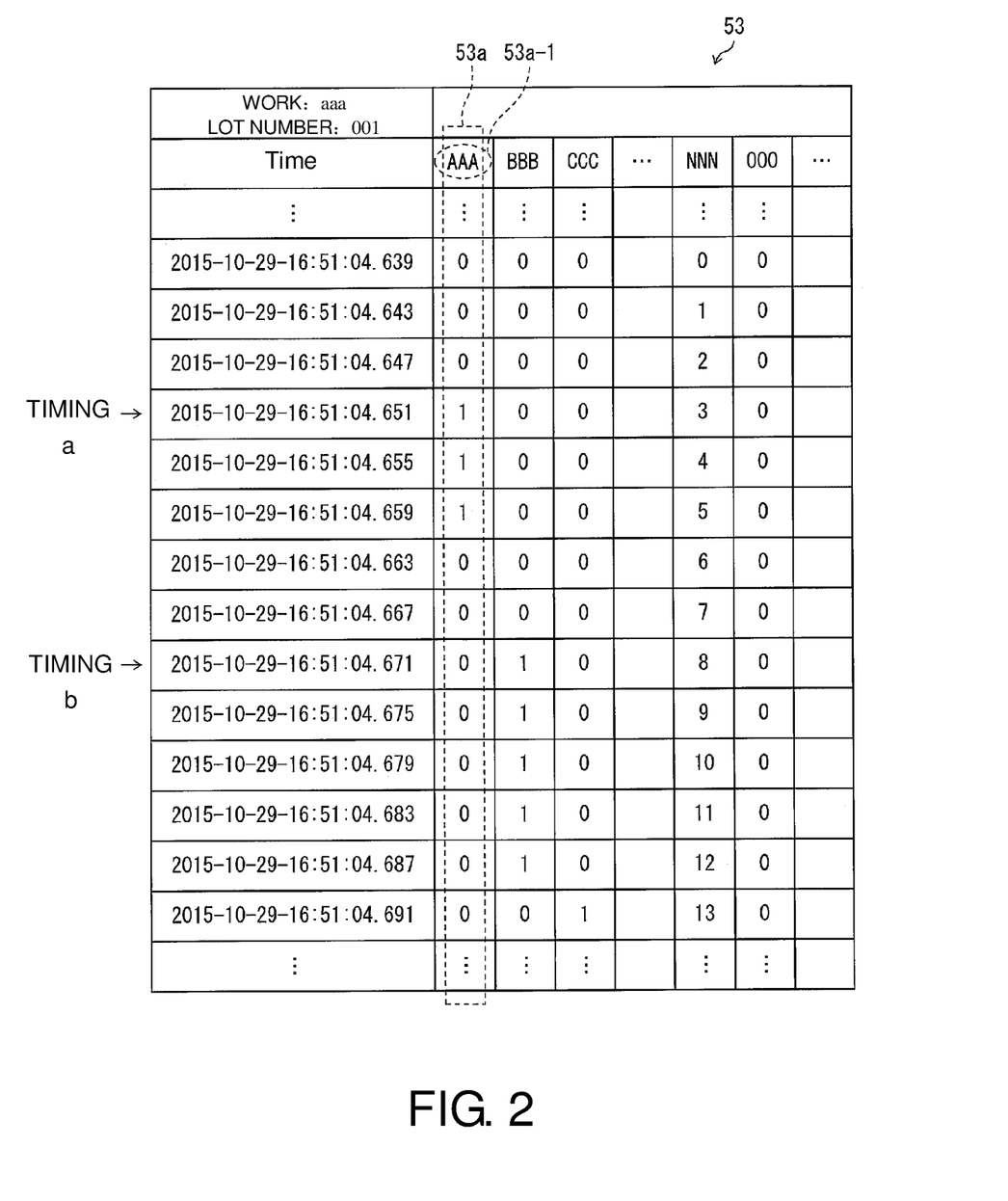
FIG. 2 is a diagram illustrating an example of actual operation information that is stored in a storage unit of a control device that is provided in the monitoring system according to the embodiment.

FIG. 2 is a diagram illustrating an example of actual operation information 53 that is stored in a storage unit 12 of the control device 10. A generation unit 11 of the control device 10 generates, on the basis of the operation signals received from the actual machine 1 every time the actual machine 1 performs a series of processes, actual operation information 53 that associates actual operation data 53a that indicates actual operations of each portion of the actual machine 1 and a time at which the operation signals have been received with each portion. Note that the series of processes described herein means a series of operations that are performed by each portion of the actual machine 1 such as processes from a start to an end of one piece of manufacturing work in a case in which the actual machine 1 is a manufacturing device, for example.

In addition, the actual operation data 53a includes actual operation data identification information 53a-1 for identifying the actual operation data 53a. In addition, the actual operation information 53 includes information about a type of manufactured work of the actual machine 1 and a lot number of the work.

The generation unit 11 generates the actual operation information 53 as illustrated in FIG. 2 on the basis of the operation signals received from the actual machine 1 and stores the generated actual operation information 53 in the storage unit 12. Specifically, when an operation start signal included in a control signal transmitted by the control device 10 to the actual machine 1 is transmitted to the actual machine 1, the generation unit 11 starts the generation of the actual operation information 53 on the basis of the operation signals received from the actual machine 1. Then, when an operation end signal included in the control signal is transmitted to the actual machine 1, the generation of the actual operation information 53 is ended. Therefore, one actual operation information item 53 includes a plurality of actual operation data 53a that indicate operations of each portion of the actual machine 1 in one series of processes in the actual machine 1. Note that although the embodiment is configured that the control device 10 includes the generation unit 11, the monitoring device 30 may include the generation unit 11.

In addition, the timings at which the generation of the actual operation information 53 is started and ended are not limited thereto, and for example, timings at which the control device 10 outputs predetermined commands to the actual machine 1 may be regarded as the timings at which the generation is started and ended.

In addition, a timing at which a predetermined sensor that is included in the actual machine 1 detects ON or OFF may be regarded as the timing at which the generation is started, and a timing at which the sensor detects OFF or ON may be regarded as the timing at which the generation is ended.

Further, the timings at which the generation is started and ended may be set on the basis of outputs from measurement devices, such as timings at which values measured by the measurement devices that are included in the actual machine 1 and output analog signals, such as a thermometer, a flowmeter, an ammeter, and a pressure meter, reach predetermined threshold values.

It is possible to generate the actual operation information 53 that matches the timings of the operations of the actual machine 1 by setting the timings at which the generation of the actual operation information 53 is started and ended as described above.

The display device 20 is a device that includes, for example, a liquid crystal display (LCD), an organic EL display (Organic Light Emitting Diode, OLED), or the like and displays an image outputted from the monitoring device 30.

The input device 25 is a device that receives user's inputs, such as a keyboard and a mouse, for example, and outputs signals in accordance with the received inputs to the monitoring device 30.

(Configuration of Monitoring Device)

The monitoring device 30 is a device that performs monitoring on operations of the actual machine 1 and includes an acquisition unit 31, a control unit 40, the storage unit 50, and a setting unit 69.

The storage unit 50 stores operation information 51, related information 54, design information 58, evaluation target information 59, allowable range information 60, simulation data 61, and feature amount information 62. In addition, the operation information 51 includes reference operation information 52 and actual operation information 53, and the related information 54 includes first related information 55 and second related information 56. Note that details of each information item that is stored in the storage unit 50 will be described later.

When the actual operation information 53 is stored in the storage unit 12 of the control device 10, the acquisition unit 31 acquires the actual operation information 53 from the storage unit 12 and saves the acquired actual operation information 53 in the storage unit 50.

In addition, the acquisition unit 31 generates the reference operation information 52 from one of the actual operation information 53 acquired from the storage unit 12 of the control device 10 and stores the reference operation information 52 in the storage unit 50. For example, the acquisition unit 31 may regard the actual operation information that is acquired first for a certain lot number as the reference operation information 52.

Alternatively, the acquisition unit 31 may regard the actual operation information 53 that is designated by a selection instruction as the reference operation information 52 in accordance with the selection instruction inputted to the input device 25.

At this time, a user may input, to the input device 25, the selection instruction for designating the actual operation information 53 stored in the storage unit 50 in a period during which the user confirms that the actual machine 1 is operating normally by means of visual checking or the like.

Note that the method of generating the reference operation information 52 is not limited thereto, for example, and a configuration may also be employed that the user performs an input to the input device 25 and the acquisition unit 31 generates the reference operation information 52 based on the input from the input device 25 and stores the reference operation information in the storage unit 50. For example, operations of each portion of the actual machine 1 when ideal operations are performed may be obtained by simulation, and the reference operation information 52 may be generated on the basis of the result of the simulation.

Figure 3:
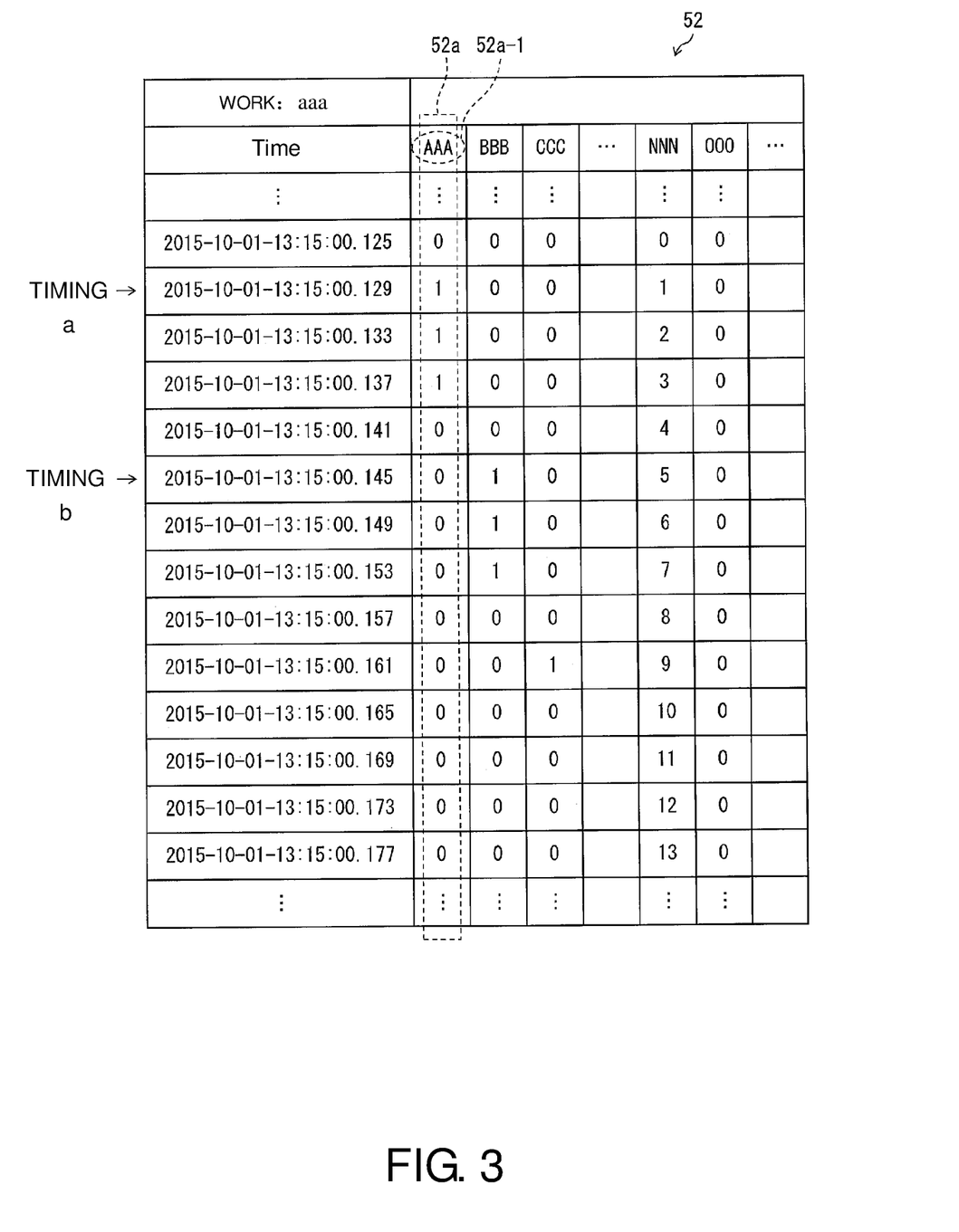
FIG. 3 is a diagram illustrating an example of reference operation information that is stored in a storage unit of a monitoring device that is provided in the monitoring system according to the embodiment.

FIG. 3 is a diagram illustrating an example of the reference operation information 52 that is stored in the storage unit 50. As illustrated in FIG. 3, the reference operation information 52 is information in which reference operation data 52a indicating reference operations of the respective portions of the actual machine 1 is associated with times and dates.

In addition, the reference operation information 52 includes information about types of target manufacturing work of the reference motions of the actual machine 1. Note that the reference operation data 52a includes reference operation data identification information 52a-1 for identifying the reference operation data 52a.

The setting unit 69 includes a display item setting unit 70, a first related information setting unit 71, a second related information setting unit 72, an evaluation target setting unit 73, and an allowable range setting unit 74.

The display item setting unit 70 sets names of display items to be displayed in a timing chart, which will be described later, on a basis of user's inputs from the input device 25 and stores the names of the display items as display item information 57 in the storage unit 50. The names of the display items are information that indicates types of operations of each portion of the actual machine 1.

Figure 4:
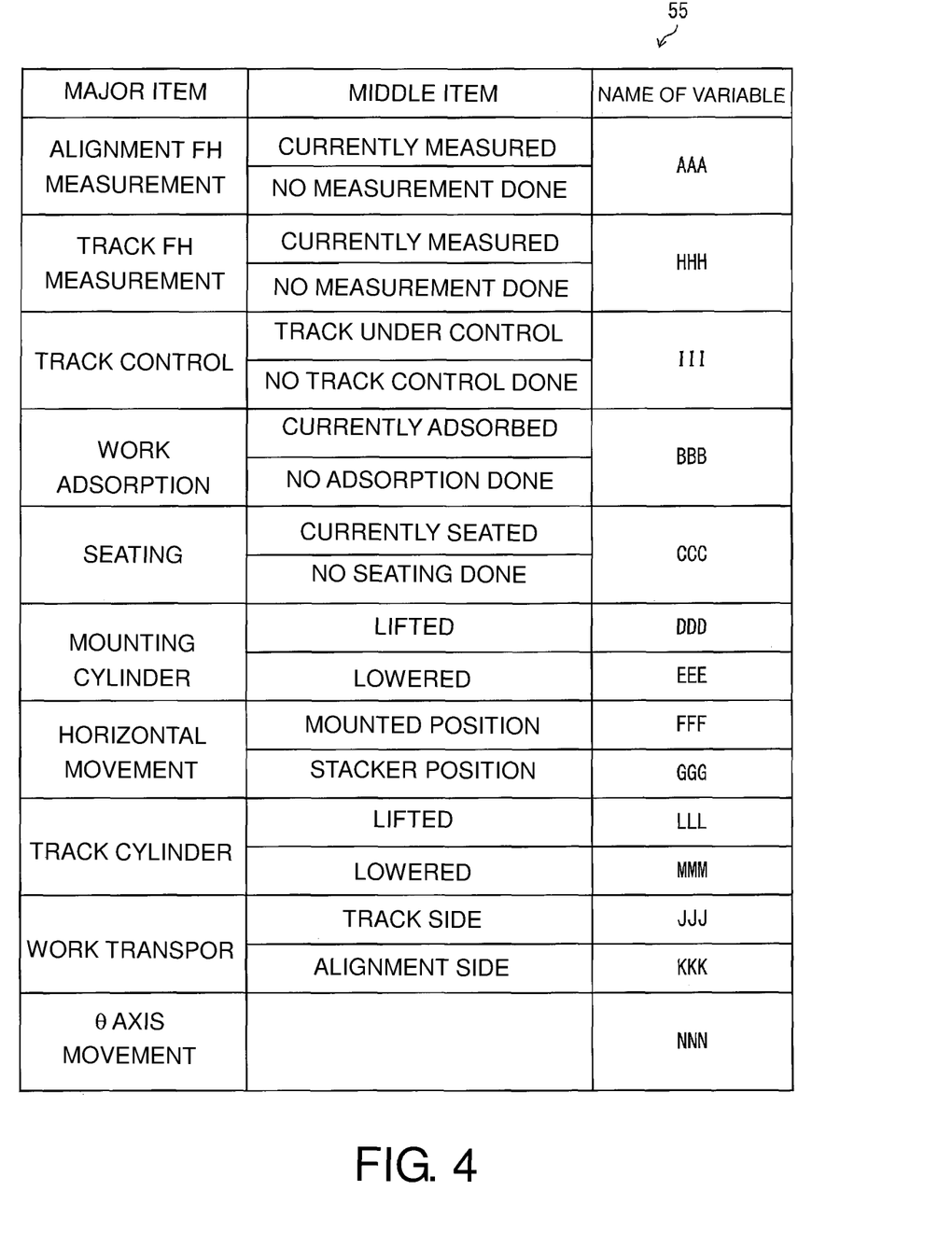
FIG. 4 is a diagram illustrating an example of first related information that is stored in the storage unit of the monitoring device.

FIG. 4 is a diagram illustrating an example of the first related information 55. The first related information setting unit 71 sets the first related information 55 as illustrated in FIG. 4 on the basis of the user's input to the input device 25 and the display item information 57 stored in the storage unit 50 and stores the first related information 55 in the storage unit 50. The first related information 55 is information that indicates correspondence between the names of the display items displayed in the timing chart, which will be described later, the actual operation data identification information 53a-1 of the actual operation information 53, and the reference operation data identification information 52a-1 of the reference operation information 52. In FIG. 4, "NAME OF VARIABLE" means the actual operation data identification information 53a-1 and the reference operation data identification information 52a-1.

Figure 5:
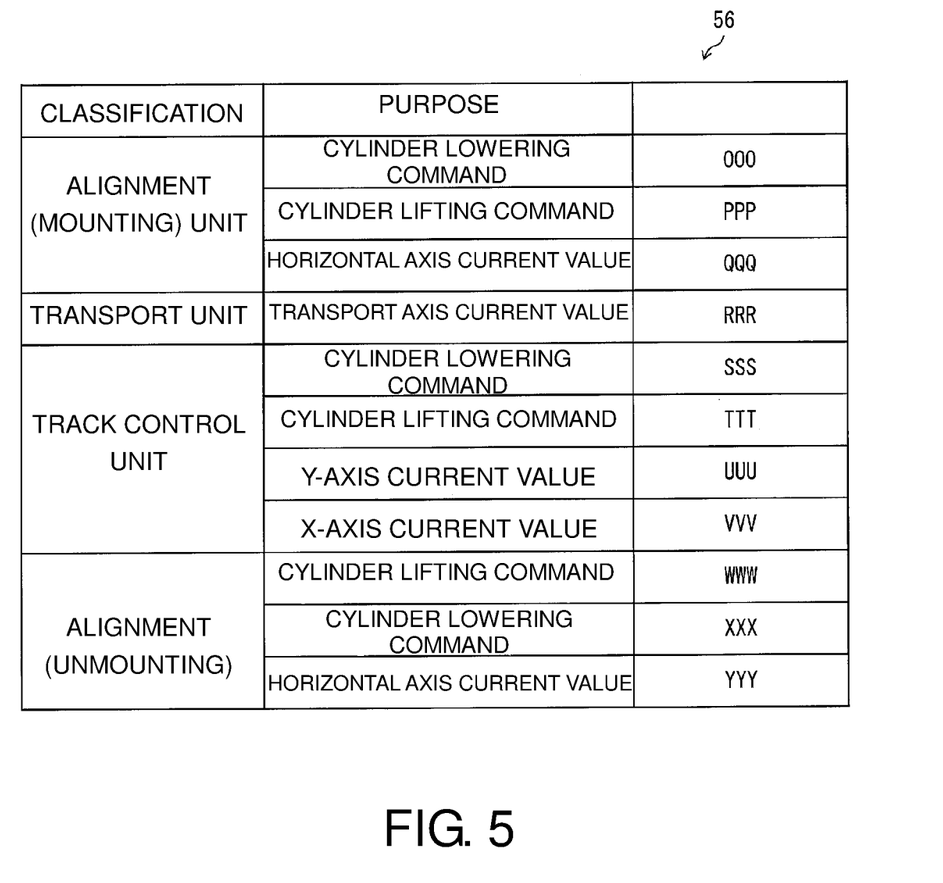
FIG. 5 is a diagram illustrating an example of second related information that is stored in the storage unit of the monitoring device.

FIG. 5 is a diagram illustrating an example of the second related information 56. The second related information setting unit 72 sets the second related information 56 as illustrated in FIG. 5 on the basis of the user's input to the input device 25 and stores the second related information 56 in the storage unit 50.

The second related information 56 is information that indicates correspondence between operation types of components that are included in a virtual machine on an image that simulates the actual machine 1, the actual operation data identification information 53a-1 of the actual operation information 53, and the reference operation data identification information 52a-1 of the reference operation information 52. In other words, the second related information 56 is information that indicates which actual operation data 53a and which reference operation data 52a represent the operations of the components of the virtual machine.

"NAME OF VARIABLE" in FIG. 5 also means the actual operation data identification information 53a-1 and the reference operation data identification information 52a-1. In addition, "CLASSIFICATION" in FIG. 5 means components that are included in the virtual machine, and "PURPOSE" means operation types of the components. For example, "CLASSIFICATION: ALIGNMENT UNIT", "PURPOSE: HORIZONTAL AXIS CURRENT VALUE" means an operation in a horizontal axis direction of a component called an alignment unit. In addition, the components that are included in the virtual machine are included in the design information 58, which will be described later.

The evaluation target setting unit 73 sets the feature amounts that are evaluation targets on the basis of inputs from the input device 25 and associates and stores the feature amounts with the names of the evaluation items as the evaluation target information 59 in the storage unit 50.

The feature amounts described herein are values that represent operations of each portion in the actual machine 1, such as a period of time from a time at which the operation information 51 is recorded for the first time to a time at which a value of data represented by identification information "AAA" is switched to "1", a period of time during which a value of data represented by identification information "BBB" is "1", a period of time from a time at which the first recording is performed to a time at which a value of data represented by identification information "NNN" exceeds "50", a period of time from a time at which the value of the data represented by the identification information "AAA" is switched to "1" to the time at which the value of the data represented by other identification information "BBB" is switched to "1", and a value of data represented by identification information "PPP", for example. Note that the evaluation target setting unit 73 may set a plurality of feature amounts that are evaluation targets.

Figure 7A:
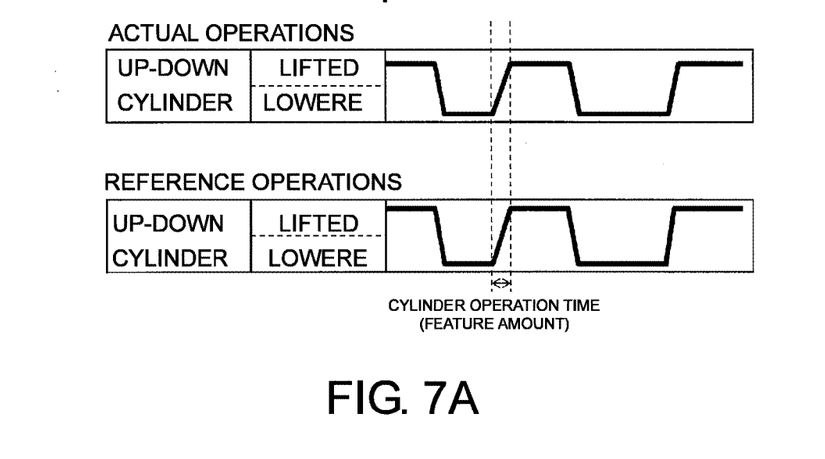
FIG. 7A is a diagram illustrating an example of a relation between a feature amount set by an evaluation item setting unit and an operation of an actual machine.

FIG. 7A is a diagram illustrating an example of a relation between a feature amount that is set by the evaluation target setting unit 73 as an evaluation target and an operation of the actual machine 1. In a case in which the name of the evaluation item of the feature amount set by the evaluation target setting unit 73 is "CYLINDER OPERATION TIME", for example, the evaluation target setting unit 73 stores, as a feature amount to be evaluated as an evaluation target, a period of time taken by an up-down cylinder to be brought into a lifted state from a lowered state.

The allowable range setting unit 74 sets, on the basis of an input from the input device 25, an allowable range of a deviation amount of the feature amount, which represents a difference between the feature amount that is obtained from the actual operation information 53 as an evaluation target and the feature amount that is obtained from the reference operation information 52 as an evaluation target.

Although a method of setting the allowable range of the deviation amount of the feature amount is not particularly limited, a method in which the user directly inputs the allowable range via the input device 25, for example, may be conceived. In another method, a value range of x±6σ may be regarded as the allowable range when an average value of feature amounts of the evaluation target obtained from the actual operation information 53 that is stored in the storage unit 50 is assumed to be x, and a standard deviation is assumed to be G.

In addition, when malfunction of the actual machine 1 is discovered, the user may input a malfunction occurrence time to the input device 25, and the allowable range setting unit 74 may set a value of a feature amount of the evaluation target that is obtained from the actual operation information 53 corresponding to the inputted malfunction occurrence time to be a threshold value for setting the allowable range.

In addition, the allowable range setting unit 74 may set the threshold value for setting the allowable range on the basis of a bathtub curve or a Weibull distribution function. Further, a plurality of allowable ranges may be set by the allowable range setting unit 74 for one feature amount that is an evaluation target. In this case, it is possible to provide an allowable range as a predictive line indicating that it is necessary for a supervisor to perform checking although the likelihood of malfunction is low and to provide an allowable range as a warning line that is wider than the allowable range of the predictive line and indicates a higher likelihood of malfunction.

The control unit 40 includes a comparison unit 32, a timing chart generation unit 41, a trend graph generation unit 42, an abnormality report unit 43, a simulation image drawing unit 45, and a simulation data generation unit 44.

When the acquisition unit 31 acquires the actual operation information 53 and stores the actual operation information 53 in the storage unit 50, the comparison unit 32 calculates deviation amounts of the feature amounts corresponding to the names of evaluation items indicated by the evaluation target information 59 on the basis of the latest actual operation information 53, the reference operation information 52, and the evaluation target information 59. Then, the comparison unit 32 stores, in the storage unit 50, a feature amount information 62 in which the calculated deviation amounts, the names of the evaluation items, and the date and time when the latest actual operation information 53 is generated (that is, the date and time when the actual operation is performed (for example, a date and time when a series of processes are started)) are associated. Therefore, in a case in which a plurality of feature amounts that are set as evaluation targets, a plurality of feature amount information are stored for each evaluation target item.

The timing chart generation unit 41 generates, on the basis of an input from the input device 25, a timing chart with reference to the reference operation information 52 and the actual operation information 53 that are stored in the storage unit 50 and the first related information 55.

Specifically, the timing chart generation unit 41 specifies the actual operation data identification information 53*a*-1 and the reference operation data identification information 52*a*-1 (illustrated as NAME OF VARIABLE in FIG. 4) corresponding to each of the names of the display items for each of the names of the display items that are indicated by the first related information 55, and reads the actual operation data 53*a* from the actual operation information 53 stored in the storage unit 50, which includes the actual operation data identification information 53*a*-1 specified in the latest actual operation information 53 and the time and date thereof, and the reference operation data 52*a* from the reference operation information 52 stored in the storage unit 50, which includes the reference operation data identification information 52*a*-1 specified in the latest reference operation information 52 and the time and date thereof.

Then, the timing chart generation unit 41 generates a timing chart of actual operations (actual operation timing chart) on the basis of the read time and date and the actual operation data 53*a* and also generates a timing chart of reference operations (reference operation timing chart) on the basis of the read time and date and the reference operation data 52*a*.

At this time, the timing chart generation unit 41 associates the generated timing charts with the names of display items.

Here, since the names of the display items indicate types of operations of each portion of the actual machine 1, it is possible to generate timing charts indicating temporal change in the latest series of processes for the operations of each portion of the actual machine 1.

Then, the timing chart generation unit 41 displays the timing charts of the actual operations and the timing charts of the reference operations on the same time axis on the display device 20. At this time, the timing chart generation unit 41 also displays a type of work and a lot number that are included in the read actual operation information 53 in addition to the two timing charts.

Figure 6:
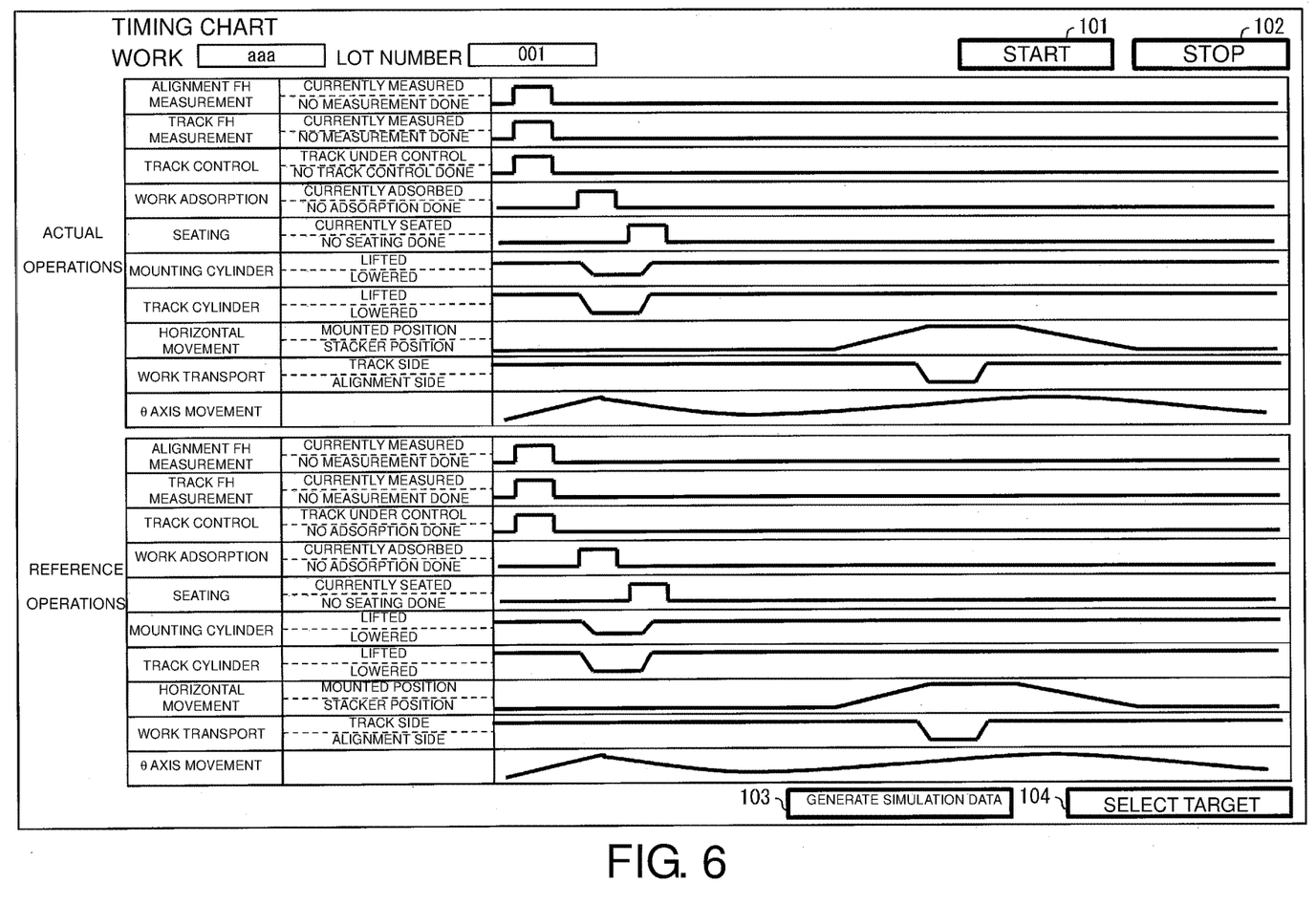
FIG. 6 is a diagram illustrating an example of a screen that is displayed on a display device that is provided in the monitoring system according to the embodiment.

FIG. 6 is a diagram illustrating an example of a screen that is displayed on the display device 20 and illustrates a state in which the timing charts generated by the timing chart generation unit 41 are displayed.

As illustrated in FIG. 6, the timing charts of the actual operations and the timing charts of the reference operations are displayed on the same time axis on the display device 20 as described above. Therefore, the user can easily ascertain a difference between the timing charts of the actual operations and the timing charts of the reference operations at first sight. In this manner, it is possible to easily ascertain an abnormality in the actual machine via a deviation from the reference operations.

Note that, as illustrated in FIG. 6, the timing charts generated by the timing chart generation unit 41 are displayed in an order of the names of the display items indicated by the first related information 55 illustrated in FIG. 4. In the embodiment, the display items are displayed in the order of (1) a bit signal, (2) two variable signals, (3) an analog signal from the upper side in the timing charts. In addition, the display items are aligned and displayed in the order from the display item with the fastest change in the signal in the reference operations in each of (1) to (3) described above. Therefore, the user can easily ascertain switching of the order of the change in the signals in the actual operations when compared with the reference operations, if any.

The trend graph generation unit 42 generates a trend graph that indicates temporal change in a deviation amount of a feature amount of each evaluation item with reference to the feature amount information 62 that is stored in the storage unit 50, on the basis of an input from the input device 25.

Figure 7B:
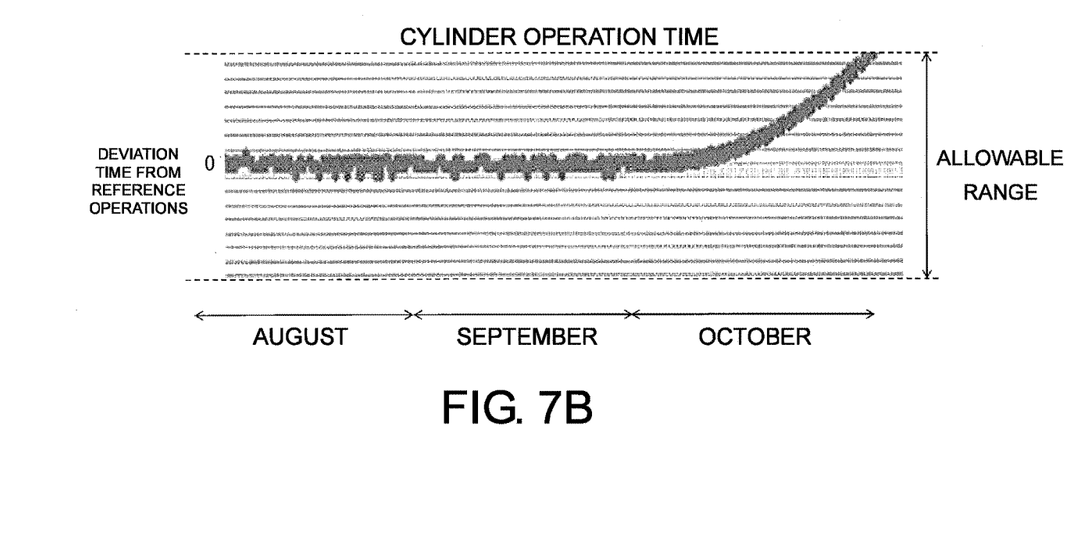
FIG. 7B is a diagram illustrating an example of a trend graph that is generated by a trend graph generation unit.
Figure 8A:
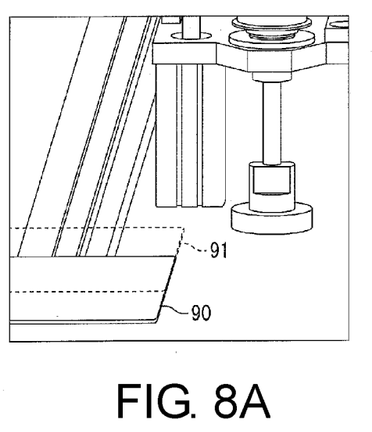
FIGS. 8A to 8D are diagrams illustrating an example of a simulation that is displayed on the display device.
Figure 8B:
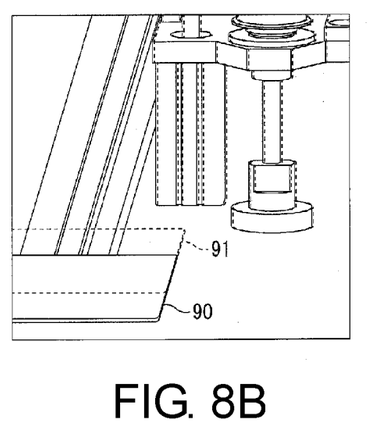
Figure 8C:
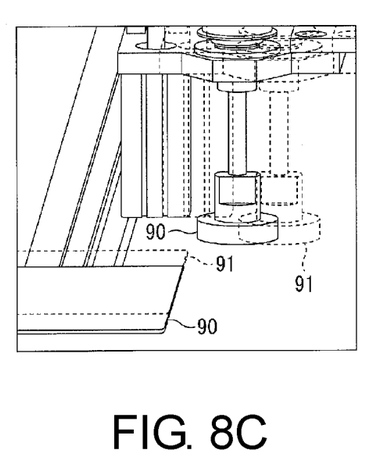
Figure 8D:
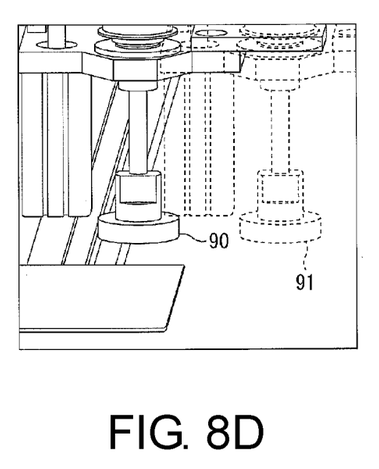

FIG. 7B is a diagram illustrating an example of a trend graph that is generated by the trend graph generation unit 42 and is displayed on the display device 20. FIG. 7B illustrates an example in which the trend graph generation unit 42 displays a trend graph for the evaluation item represented by the name of the evaluation item "CYLINDER OPERATION TIME" illustrated in FIG. 7A. In this manner, the user can check the temporal change (trend) of the deviation amount of the feature amount, such as when the deviation amount of the feature amount has started to increase, by using the trend graph.

When the timing chart generation unit 41 generates the timing charts, the abnormality report unit 43 acquires the feature amount information 62 corresponding to the actual operation information 53 that is used by the timing chart generation unit 41 to generate the timing charts from the storage unit 50. Then, the abnormality report unit 43 determines whether or not the deviation amount of the feature amount indicated by the acquired feature amount information 62 is within the allowable range with reference to the allowable range information 60. In a case in which the deviation amount of the feature amount is outside the allowable range, the abnormality report unit 43 provides a notification of an abnormality indicating that an abnormality has occurred to the user.

Specifically, the abnormality report unit 43 displays a portion in which the deviation amount of the feature amount is outside the allowable range in the timing chart that is displayed on the display device 20 in an emphasized manner with reference to the first related information 55 and the evaluation target information 59.

Hereinafter, operations of the abnormality report unit 43 will be described by using the actual operation information 53 illustrated in FIG. 2 and the reference operation information 52 illustrated in FIG. 3 as an example.

In a case in which the feature amount, the deviation amount of which is outside the allowable range, is a period of time from a start of a series of process to a time at which the value of the data represented by the identification information "AAA" is switched to "1" (the timing a in FIGS. 2 and 3), for example, the abnormality report unit 43 displays a portion from the start to the timing a in an emphasized manner in the timing chart of the display item corresponding to the data represented by the identification information "AAA". In a case in which a deviation at the timing a is observed in the actual operation information 53 and the reference operation information 52, and the deviation amount of the feature amount is outside the allowable range due to the deviation at the timing a as illustrated in FIGS. 2 and 3, for example, the abnormality report unit 43 displays a portion from the position corresponding to the first record to the position at the time corresponding to the timing a in an emphasized manner in the timing chart.

Similarly, in a case in which the feature amount, the deviation amount of which is outside the allowable range, is a period of time during which the value of the data represented by the identification information "BBB" is "1", the abnormality report unit 43 displays a portion in which the value of the data represented by the identification information "BBB" is "1" in an emphasized manner in the timing chart of the display item corresponding to the data represented by the identification information "BBB". That is, the abnormality report unit 43 displays a portion from the position corresponding to the record represented by "2015-10-1-13:15:00.145" to the position corresponding to the record represented by "2015-10-01-13:15:00.153" of the reference operation information 52 illustrated in FIG. 3 in an emphasized manner on the timing chart of the reference operations. In addition, the abnormality report unit 43 displays a portion from the position corresponding to the record represented by "2015-10-29:16:51:04.671" to the position corresponding to the record represented by "2015-10-29:16:51:04.687" of the actual operation information 53 illustrated in FIG. 2 in an emphasized manner on the timing chart of the actual operations.

In addition, in a case in which the feature amount, the deviation amount of which is outside the allowable range, is a period of time from the time at which the value of the data represented by the identification information "AAA" is switched to "1" (timing a in FIGS. 2 and 3) to the time at which the value of the data represented by other identification information "BBB" is switched to "1" (timing b in FIGS. 2 and 3), the abnormality report unit 43 displays the portion from the timing a to the timing b in an emphasized manner in the timing chart of the display item corresponding to the data represented by the identification information "AAA" and the timing chart of the display item corresponding to the data represented by the identification information "BBB". In addition, in a case in which the feature amount, the deviation amount of which is outside the allowable range, is the value of the data represented by the identification information "PPP", the abnormality report unit 43 displays a portion in which the deviation amount of the feature amount is outside the allowable range in an emphasized manner in the timing chart of the display item corresponding to the data represented by the identification information "PPP".

Although a method of performing the display in an emphasized manner is not particularly limited, a method of displaying the portion with a color different from that for the other parts, a method of indicating the portion with a leader line and displaying "ERROR", a method of surrounding the portion with a red frame, and the like may be exemplified, for example.

In this manner, the user can easily ascertain that the actual operations of the actual machine 1 deviate from the reference operations by the abnormality report unit 43 displaying the abnormality notification in the timing chart that is displayed on the display device 20. In addition, the user can easily ascertain which portion in the actual machine 1 has performed the abnormality operation by displaying the portion, the deviation amount of which is outside the allowable range, in an emphasized manner on the timing chart.

When the simulation data generation unit 44 receives a signal for generating simulation data from the input device 25, the simulation data generation unit 44 generates the simulation data 61 such as computer aided design (CAD) data on the basis of the reference operation information 52, the actual operation information 53, the second related information 56, and the design information 58 with reference to the storage unit 50 and stores the generated simulation data 61 in the storage unit 50.

Here, the design information 58 is design information necessary for displaying the virtual machine that simulates the actual machine 1 on simulation software, that is, three-dimensional shape data of the actual machine 1 is stored. In addition, the design information 58 has information for specifying components that are included in the virtual machine.

The simulation data generation unit 44, according to the second related information 56, specifies the corresponding actual operation data identification information 53*a*-1 and the reference operation data identification information 52*a*-1 (described as NAMES OF VARIABLES in FIG. 5) for each of operation types of the components that are included in the virtual machine. Then, the simulation data generation unit 44 reads the actual operation data 53*a* and the reference operation data 52*a* that includes the actual operation data identification information 53*a*-1 and the reference operation data identification information 52*a*-1 specified by the latest actual operation information 53 in the actual operation information 53 that is stored in the storage unit 50.

The simulation data generation unit 44 generates data that indicates a real image that is an image when the virtual machine performs the actual operations indicated by the actual operation data 53*a* by assigning the values indicated by the read actual operation data 53*a* to the operation types of the corresponding components in the design information. Similarly, the simulation data generation unit 44 generates data that indicates a reference image that is an image when the virtual machine performs the reference operations indicated by the reference operation data 52*a* by assigning the values indicated by the read reference operation data 52*a* to the operation types of the corresponding components in the design information. Then, the simulation data generation unit 44 generates the simulation data 61 that is data in which the real image and the reference image are overlapped (superimposed).

The simulation image drawing unit 45 displays the simulation data 61 on the display device 20 on the basis of a signal from the input device 25.

(Operation of Monitoring System)

Next, operations of the monitoring system 100 will be described. Note that a case in which the user performs operations by using a mouse as the input device 25 will be described below.

The monitoring device 30 acquires the actual operation information 53 from the storage unit 12 of the control device 10 by the acquisition unit 31 while the control device 10 controls the actual machine 1 and stores the actual operation information 53 in the storage unit 50. In addition, when the actual operation information 53 is stored in the storage unit 50, the feature amount information 62 is generated by the comparison unit 32 and is then stored in the storage unit 50.

While the control device 10 controls the actual machine 1, the image as illustrated in FIG. 6 is displayed on the display device 20. If the user presses (clicks) a start button 101 by using a mouse, the timing chart generation unit 41 generates the timing charts and displays the timing charts on the display device 20.

Specifically, the timing chart generation unit 41 generates the timing charts of the actual operations by using the latest actual operation information 53 in the actual operation information 53 stored in the storage unit 50, generates the timing charts of the reference operations by using the reference operation information 52 corresponding to the latest actual operation information 53, and displays the timing charts of the actual operations and the reference operations together.

Then, when the actual operation information 53 in the storage unit 50 is updated, the timing chart generation unit 41 generates the timing charts using the new (latest) actual operation information 53 and updates the timing charts of the actual operations displayed on the display device 20.

Thereafter, the timing chart generation unit 41 continuously updates the timing charts of the actual operations, which is displayed on the display device 20, every time the actual operation information 53 is updated until the user presses a stop button 102.

At this time, the abnormality report unit 43 determines whether the deviation amounts of the feature amounts are within the allowable range every time the timing chart generation unit 41 generates the timing charts, and in a case in which it is determined that the deviation amounts are outside the allowable range, provides a report of an abnormality.

When the stop button 102 is pressed, the timing chart generation unit 41 ends the generation of the timing charts, and the timing charts displayed on the display device 20 are not updated. Therefore, the user can check the timing charts by pressing the stop button 102, for example, in a case in which a report of an abnormality has been provided to the display device 20 and the like.

If the simulation data generation button 103 is pressed by the user, the simulation data generation unit 44 generates the simulation data 61 in accordance with the timing charts displayed on the display device 20.

That is, the simulation data generation unit 44 generates the simulation data 61 on the basis of the actual operation information 53 corresponding to the timing charts displayed on the display device 20, the reference operation information 52, the second related information 56, and the design information 58.

When the user inputs a display command of the simulation data 61 via the input device 25, the simulation image drawing unit 45 reads the simulation data 61 stored in the storage unit 50 and displays the simulation on the display device 20.

FIGS. 8A to 8D are diagrams illustrating an example of the simulation displayed on the display device 20. In FIGS. 8A to 8D, a reference image 91 that is an image when the virtual machine that simulates the actual machine 1 performs reference operations indicated by the reference operation information 52 is represented by dotted lines, the real image 90 that is an image when the virtual machine performs actual operations indicated by the actual operation information 53 is represented by solid lines, and the simulation is displayed on the display device 20 in the order of FIGS. 8A to 8D.

The reference operations and the actual operations in a period until the actual machine 1 ends a series of processes after the actual machine 1 starts the processes are displayed on the display device 20 as a moving image on the same time axis by using the virtual machine on the basis of the simulation data 61.

That is, the reference image 91 that is an image when the reference operations are performed and the real image 90 that is an image when the actual operations are performed are displayed in an overlapping manner on the display device 20 as illustrated in FIGS. 8A to 8D. Therefore, the reference image 91 and the real image 90 are preferably displayed in different modes. An example in which one of the images is displayed to be semi-transparent or transparent, an example in which the two images are displayed with different colors, and the like may be exemplified as examples of the display in different modes.

As described above, it is possible to easily check the deviation of the actual operations from the reference operations by displaying the reference image 91 that is an image when the reference operations are performed and the real image 90 that is an image when the actual operations are performed in an overlapping manner.

Returning to FIG. 6, when the user presses a target selection button 104 and then selects an evaluation item, the trend graph generation unit 42 generates a trend graph of the selected evaluation item (see FIGS. 7A to 7B).

Note that a variety of methods may be conceived as methods of selecting the evaluation item. For example, if the target selection button 104 is pressed, the trend graph generation unit 42 may display a list of evaluation items indicated by the evaluation target information 59 and receive a selection instruction for selecting one in the list from the input device 25. In addition, in a case in which a period of time from a certain operation timing to another operation timing in a timing chart of a certain display item is a feature amount that is an evaluation target, the trend graph generation unit 42 may determine that the evaluation item corresponding to the feature amount has been selected in response to clicking of the portion of this time in the timing chart.

In addition, when the user places a cursor of the mouse on a trend graph displayed on the display device 20, a time and date indicated by the feature amount information 62 corresponding to the position on which the cursor is placed are displayed on the display device 20. In addition, if the user presses a specific position on the trend graph displayed on the display device 20, the timing chart generation unit 41 generates a timing chart of the time and date indicated by the feature amount information 62 corresponding to the pressed position and displays the timing chart on the display device 20.

In this manner, it is possible to track back and check a deviation amount of a feature amount in the past by the trend graph being displayed. Therefore, it is possible to specify when the deviation has occurred. In addition, it is possible to predict when the actual machine 1 will become out of order (an abnormality will occur) on the basis of when the deviation has occurred and change of the deviation amount, so as to decide whether a countermeasure is necessary to be taken, to decide a timing at which maintenance is performed, and the like.

(Example of Implementation by Software)

Control blocks (the control unit 40 and the setting unit 69, in particular) of the monitoring device 30 may be implemented by logical circuits (hardware) that are formed on an integrated circuit (IC chip) or the like or may be implemented by software using a central processing unit (CPU).

In the latter case, the monitoring device 30 includes a CPU that executes commands of a program that is software that implements the respective functions, a read only memory (ROM) or a storage device (these will be referred to as a "recording medium") in which the aforementioned program and various kinds of data are recorded in a computer-readable manner (or a CPU-readable manner), a random access memory (RAM) that develops the aforementioned program, and the like. In addition, the object of the present invention is achieved by a computer (or the CPU) reading the aforementioned program from the recording medium and executing the program. As the aforementioned recording medium, a "non-transitory tangible medium" such as a tape, a disc, a card, a semiconductor memory, or a programmable logic circuit, for example, can be used. In addition, the aforementioned program can be supplied to the aforementioned computer via an arbitrary transmission medium (a communication network, a broadcasting wave, or the like) capable of transmitting the program. Note that the present invention can also be implemented in a form of data signals, in which the aforementioned program is realized by electronic transmission, which are incorporated in a carrier wave.

The monitoring device 30 according to the embodiment of the present invention may be implemented by a computer, and in this case, a monitoring program of the monitoring device 30 that implements the aforementioned monitoring device 30 in the computer by causing the computer to operate as the respective units (software elements) provided in the monitoring device 30 and a computer readable recording medium that records the monitoring program therein are also within the scope of the present invention.

Modification Example

Next, a modification example of the monitoring device 30 will be described. In the aforementioned embodiment, the trend graph generation unit 42 generates a trend graph that indicates a temporal change in a deviation amount of a feature amount of each evaluation item. At this time, the trend graph generation unit 42 may be configured to acquire the allowable range information 60 of the feature amount corresponding to the generated trend graph and display an upper limit value and a lower limit value of the allowable range indicated by the allowable range information 60 on the trend graph.

In addition, the abnormality report unit 43 is configured to display an abnormality report on the timing chart in the aforementioned embodiment. However, the abnormality report unit 43 may be configured to display an abnormality report for a name of a display item corresponding to the feature amount, the deviation amount of which is outside the allowable range.

Further, the simulation data generation unit 44 is configured to generate the simulation data 61 on the basis of a user's input to the input device 25 in the aforementioned embodiment, the timing at which the simulation data generation unit 44 generates the simulation data 61 is not limited thereto.

For example, the simulation data generation unit 44 may generate the simulation data 61 when the abnormality report unit 43 provides the abnormality report to the user.

In addition, the abnormality report unit 43 is configured to provide the abnormality report to the user by displaying the portion in which the deviation amount of the feature amount is outside the allowable range in the emphasized manner in the timing chart in the aforementioned embodiment. However, the method of providing the abnormality report by the abnormality report unit 43 is not limited thereto, and for example, the monitoring device 30 may include a communication unit (not illustrated), and the abnormality report unit 43 may be configured to provide the abnormality report to the user by sending a mail to a mail address registered in advance via the communication unit.

Further, although the case in which the simulation data 61 generated by the simulation data generation unit 44 is data in which the real image 90 and the reference image 91 are overlapped (superimposed) has been described in the aforementioned embodiment, the simulation data 61 generated by the simulation data generation unit 44 is not limited thereto.

For example, a configuration in which the simulation data generation unit 44 separately generates the simulation data 61 of the real image 90 and the simulation data 61 of the reference image 91 and the simulation image drawing unit 45 matches the time axes thereof and displays the two simulation data items 61 arranged on the left and right sides on the display device 20 may be employed. That is, it is only necessary for the simulation data generation unit 44 to generate simulation data of the reference image that is an image when the virtual machine performs the reference operations and the real image that is an image when the virtual machine performs the actual operations.

[Conclusion]

As described above, the monitoring device according to the invention is a monitoring device that monitors operations of an actual machine, the device including: an acquisition unit which acquires actual operation data that indicates actual operations of each portion of an actual machine from a control device which controls the actual machine; a display item setting unit that sets display items that are included in a timing chart that is displayed on a display device; and a storage unit, in which the storage unit stores reference operation data indicating a reference operation of the each portion of the actual machine, first related information that associates specific actual operation data and reference operation data with the display items, and second related information that associates components that are included in a virtual machine on an image that simulates the actual machine with the specific actual operation data and the reference operation data, in which the device further including: a timing chart generation unit which generates an actual operation timing chart that indicates a temporal change in an actual operation on a basis of actual operation data corresponding to the display items in the first related information and a reference operation timing chart that indicates a temporal change in a reference operation on basis of reference operation data corresponding to the display item in the first related information for the display items, and displays the actual operation timing chart and the reference operation timing chart on the display device; and a simulation data generation unit which generates simulation data of a reference image that is an image when the virtual machine performs a reference operation and a real image that is an image when the virtual machine performs an actual operation, on a basis of the reference operation data and the actual operation data that are associated with the components in the second related information.

With the aforementioned configuration, it is possible to easily ascertain presence of deviation between actual operations and reference operations and how much the actual operations deviate from the reference operations by generating the reference operation timing chart and the reference image that indicate the reference operations of the actual machine in addition to the actual operation timing chart and the real image that indicate the actual operations of the actual machine. Therefore, it is possible to easily ascertain an abnormality in the actual machine on the basis of the deviation from the reference operations.

In the monitoring device according to the present invention, the simulation data generation unit may generate simulation data in which the reference image and the real image are superimposed.

With the aforementioned configuration, it is possible to more easily ascertain how much the actual operations deviate from the reference operations by the simulation data generation unit generating the simulation data in which the reference image and the real image are superimposed.

In the monitoring device according to the present invention, the acquisition unit may acquire actual operation data from a predetermined start timing, and the start timing may be any one of a timing at which the control device has output a predetermined command to the actual machine, a timing at which a predetermined sensor that is provided in the actual machine has detected ON or OFF, and a timing at which a value measured by a measurement device that is provided in the actual machine has reached a predetermined threshold value.

With the aforementioned configuration, it is possible to acquire the actual operation data that matches timings of the operations of the actual machine since the timing at which the acquisition of the actual operation data is started is any one of a timing at which the control device has output a predetermined command to the actual machine, a timing at which a predetermined sensor that is provided in the actual machine has detected ON or OFF, and a timing at which a value measured by a measurement device that is provided in the actual machine has reached a predetermined threshold value.

The monitoring device according to the present invention may include: an evaluation target setting unit that sets a feature amount that is an evaluation target; a comparison unit that acquires a deviation amount between the feature amount that is obtained from the actual operation data and the feature amount that is obtained from the reference operation data; and an abnormality report unit that displays an abnormality notification on the display device in a case in which the deviation amount is outside an allowable range.

With the aforementioned configuration, the user can easily ascertain that the actual operations of the actual machine deviate from the reference operations by the abnormality report unit displaying the abnormality report on the display device in a case in which the deviation amount of the feature amount is outside the allowable range.

In the monitoring device according to the present invention, the abnormality report unit may display a portion in which the deviation amount is outside the allowable range in the actual operation timing chart in an emphasized manner as the abnormality notification.

With the aforementioned configuration, the user can easily ascertain which portion in the actual machine performs abnormal operation by the portion in which the deviation amount is outside the allowable range being displayed in the emphasized manner in the timing chart.

In the monitoring device according to the present invention, the acquisition unit may acquire the actual operation data for an operation that is included in a predetermined series of processes and acquire the actual operation data every time the series of processes are performed, and the device may include: an evaluation target setting unit that sets a feature amount to be evaluated as an evaluation target; a comparison unit that acquires a deviation amount between the feature amount that is obtained from the actual operation data and the feature amount that is obtained from the reference operation data; and a trend graph generation unit that generates a trend graph that indicates a change of the deviation amount on a basis of actual operation data in the past that is acquired by the acquisition unit and displays the trend graph on the display device.

With the aforementioned configuration, it is possible to easily ascertain how the deviation amount of the feature amount changes by the trend graph generation unit that generates the trend graph that indicates the change in the deviation amount of the feature amount from the past to the present being provided. Therefore, the user can easily distinguish whether or not it is necessary to take a countermeasure by viewing the trend graph in a case in which the deviation amount of the feature amount is a large value.

In the monitoring device according to the resent invention, the simulation data generation unit may generate the simulation data in which display modes of the reference image and the real image are made to be different.

With the aforementioned configuration, the user can easily ascertain the deviation between the actual operations and the reference operations by the simulation data being displayed on the display device by the simulation data generation unit generating the simulation data in which the display modes of the reference image and the real image are made to be different.

Further, a monitoring system that includes the monitoring device, the control device, and the display device is also included in the scope of the present invention.

Note that the monitoring device may be implemented by a computer. In this case, a monitoring program that causes the computer to function as the acquisition unit, the display item setting unit, the timing chart generation unit, and the simulation data generation unit of the monitoring device and a recording medium that records the monitoring program are also included in the scope of the present invention.

The present invention is not limited to the aforementioned respective embodiments, various modifications can be made within the scope represented by the claims, and embodiments that are obtained by appropriately combining technical means respectively disclosed in different embodiments are also included within the technical scope of the present invention. Further, it is possible to fonn new technical features by combining technical means respectively disclosed in the respective embodiments.

What is claimed is:

1. A monitoring device that performs is monitoring on operations of an actual machine, the device comprising:
    an acquisition unit which acquires actual operation data that indicates actual operations of each portion of an actual machine from a control device which controls the actual machine;
    a display item setting unit that sets display items that are included in a timing chart that is displayed on a display device; and
    a storage unit,
    wherein the storage unit stores reference operation data indicating a reference operation of each portion of the actual machine,
        first related information that associates specific actual operation data and reference operation data with the display items, and
        second related information that associates components that are included in a virtual machine on an image that simulates the actual machine with the specific actual operation data and the reference operation data,
    wherein the device further comprises:
        a timing chart generation unit which generates, for the display items, an actual operation timing chart that indicates a temporal change in an actual operation on a basis of actual operation data corresponding to the display items in the first related information and a reference operation timing chart that indicates temporal change in a reference operation on a basis of reference operation data corresponding to the display item in the first related information, and displays the actual operation timing chart and the reference operation timing chart on the display device; and
        a simulation data generation unit which generates simulation data of a reference image that is an image when the virtual machine performs a reference operation and a real image that is an image when the virtual machine performs an actual operation, on a basis of the reference operation data and the actual operation data that are associated with the components in the second related information.

2. The monitoring device according to claim 1, wherein the simulation data generation unit generates simulation data in which the reference image and the real image are superimposed.

3. The monitoring device according to claim 1, wherein the acquisition unit acquires actual operation data from a predetermined start timing, and
    the start timing is any one of a timing at which the control device has output a predetermined command to the actual machine, a timing at which a predetermined sensor that is provided in the actual machine has detected ON or OFF, and a timing at which a value measured by a measurement device that is provided in the actual machine has reached a predetermined threshold value.

4. The monitoring device according to claim 1, comprising:
    an evaluation target setting unit that sets a feature amount that is an evaluation target;
    a comparison unit that acquires a deviation amount between the feature amount that is obtained from the actual operation data and the feature amount that is obtained from the reference operation data; and
    an abnormality report unit that displays an abnormality notification on the display device in a case in which the deviation amount is outside an allowable range.

5. The monitoring device according to claim 4, wherein the abnormality report unit displays a portion in which the deviation amount is outside the allowable range in the actual operation timing chart in an emphasized manner as the abnormality notification.

6. The monitoring device according to claim 1, wherein the acquisition unit acquires the actual operation data for an operation that is included in a predetermined series of processes and acquires the actual operation data every time the series of processes are performed, and
    the device comprises:
        an evaluation target setting unit that sets a feature amount that is an evaluation target;
        a comparison unit that acquires a deviation amount between the feature amount that is obtained from the actual operation data and the feature amount that is obtained from the reference operation data; and
        a trend graph generation unit that generates a trend graph that indicates change in the deviation amount on a basis of actual operation data in the past that is acquired by the acquisition unit and displays the trend graph on the display device.

7. The monitoring device according to claim 1, wherein the simulation data generation unit generates the simulation data in which display modes of the reference image and the real image are made to be different.

8. The monitoring according to claim 1 comprising:
    the control device; and
    the display device.

9. A non-transitory computer-readable medium storing a monitoring program that causes a computer to function as the monitoring device according to claim 1, wherein the stored monitoring program causing the computer to function as:
    the acquisition unit;
    the display item setting unit;
    the timing chart generation unit; and
    the simulation data generation unit.

10. The monitoring device according to claim 2, wherein the acquisition unit acquires actual operation data from a predetermined start timing, and
    the start timing is any one of a timing at which the control device has output a predetermined command to the actual machine, a timing at which a predetermined sensor that is provided in the actual machine has detected ON or OFF, and a timing at which a value measured by a measurement device that is provided in the actual machine has reached a predetermined threshold value.

11. The monitoring device according to claim 2, comprising:
    an evaluation target setting unit that sets a feature amount that is an evaluation target;
    a comparison unit that acquires a deviation amount between the feature amount that is obtained from the actual operation data and the feature amount that is obtained from the reference operation data; and an abnormality report unit that displays an abnormality notification on the display device in a case in which the deviation amount is outside an allowable range.

12. The monitoring device according to claim 3, comprising:

an evaluation target setting unit that sets a feature amount that is an evaluation target;

a comparison unit that acquires a deviation amount between the feature amount that is obtained from the actual operation data and the feature amount that is obtained from the reference operation data; and an abnormality report unit that displays an abnormality notification on the display device in a case in which the deviation amount is outside an allowable range.

13. The monitoring device according to claim 2, wherein the acquisition unit acquires the actual operation data for an operation that is included in a predetermined series of processes and acquires the actual operation data every time the series of processes are performed, and the device comprises:

an evaluation target setting unit that sets a feature amount that is an evaluation target;

a comparison unit that acquires a deviation amount between the feature amount that is obtained from the actual operation data and the feature amount that is obtained from the reference operation data; and a trend graph generation unit that generates a trend graph that indicates change in the deviation amount on a basis of actual operation data in the past that is acquired by the acquisition unit and displays the trend graph on the display device.

14. The monitoring device according to claim 3, wherein the acquisition unit acquires the actual operation data for an operation that is included in a predetermined series of processes and acquires the actual operation data every time the series of processes are performed, and the device comprises:

an evaluation target setting unit that sets a feature amount that is an evaluation target;

a comparison unit that acquires a deviation amount between the feature amount that is obtained from the actual operation data and the feature amount that is obtained from the reference operation data; and a trend graph generation unit that generates a trend graph that indicates change in the deviation amount on a basis of actual operation data in the past that is acquired by the acquisition unit and displays the trend graph on the display device.

15. The monitoring device according to claim 2, wherein the simulation data generation unit generates the simulation data in which display modes of the reference image and the real image are made to be different.

16. The monitoring device according to claim 3, wherein the simulation data generation unit generates the simulation data in which display modes of the reference image and the real image are made to be different.

17. The monitoring device according to claim 4, wherein the simulation data generation unit generates the simulation data in which display modes of the reference image and the real image are made to be different.

18. The monitoring device according to claim 5, wherein the simulation data generation unit generates the simulation data in which display modes of the reference image and the real image are made to be different.

19. The monitoring device according to claim 6, wherein the simulation data generation unit generates the simulation data in which display modes of the reference image and the real image are made to be different.

\* \* \* \* \*